(12) United States Patent
Makaya et al.

(10) Patent No.: US 12,511,164 B2
(45) Date of Patent: Dec. 30, 2025

(54) MACHINE LEARNING WORKLOAD ORCHESTRATION IN HETEROGENEOUS CLUSTERS

(71) Applicant: Hewlett-Packard Development Company, L.P., Spring, TX (US)

(72) Inventors: Christian Makaya, Palo Alto, CA (US); Madhu Athreya, Palo Alto, CA (US); Carlos Haas Costa, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 540 days.

(21) Appl. No.: 17/783,311

(22) PCT Filed: Dec. 20, 2019

(86) PCT No.: PCT/US2019/068121
§ 371 (c)(1),
(2) Date: Jun. 8, 2022

(87) PCT Pub. No.: WO2021/126272
PCT Pub. Date: Jun. 24, 2021

(65) Prior Publication Data
US 2023/0012487 A1 Jan. 19, 2023

(51) Int. Cl.
*G06F 9/50* (2006.01)
(52) U.S. Cl.
CPC .................. *G06F 9/505* (2013.01)
(58) Field of Classification Search
CPC ............ G06F 9/505; G06F 2209/5017; G06F 9/5027; G06F 9/5072; G06N 20/00
See application file for complete search history.

(56) References Cited

U.S. PATENT DOCUMENTS

| 9,396,033 B2 | 7/2016 | Lee et al. |
| 9,875,142 B2 | 1/2018 | Fritz et al. |
| 10,235,625 B1 | 3/2019 | Walters et al. |

(Continued)

FOREIGN PATENT DOCUMENTS

| CN | 104243617 A | 12/2014 |
| CN | 104317658 A | 1/2015 |

(Continued)

OTHER PUBLICATIONS

Pan et al., "A load-adaptive feedback scheduling strategy for heterogeneous Hadoop cluster", Computer Engineering &. Science, vol. 39, No. 3, Mar. 2017, pp. 413-423, (English Abstract Only).

*Primary Examiner* — Sisley N Kim
(74) *Attorney, Agent, or Firm* — Quarles & Brady LLP (57) ABSTRACT

Systems and methods are described herein to orchestrate the execution of an application, such as a machine learning or artificial intelligence application, using distributed compute clusters with heterogeneous compute resources. A discovery subsystem may identify the different compute resources of each compute cluster. The application is divided into a plurality of workloads with each workload associated with resource demands corresponding to the compute resources of one of the compute clusters. Adaptive modeling allows for hyperparameters to be defined for each workload based on the compute resources associated with the compute cluster to which each respective workload is assigned and the associated dataset.

20 Claims, 5 Drawing Sheets

(56) References Cited

U.S. PATENT DOCUMENTS

| | | | |
|---|---|---|---|
| 10,447,806 B1 | 10/2019 | Sahay et al. | |
| 2012/0284410 A1 | 11/2012 | Dudek et al. | |
| 2015/0378696 A1 | 12/2015 | Boehm et al. | |
| 2015/0379072 A1 | 12/2015 | Dirac et al. | |
| 2017/0024316 A1 | 1/2017 | Park et al. | |
| 2017/0068555 A1 | 3/2017 | Cropper et al. | |
| 2017/0083381 A1* | 3/2017 | Cong | G06F 9/5005 |
| 2018/0095778 A1* | 4/2018 | Aydelott | G06F 9/5055 |
| 2018/0165785 A1 | 6/2018 | Kurtz et al. | |
| 2018/0276050 A1 | 9/2018 | Gong et al. | |
| 2019/0171495 A1* | 6/2019 | Knaup | G06F 9/5088 |
| 2019/0220703 A1 | 7/2019 | Prakash et al. | |
| 2019/0228303 A1 | 7/2019 | Liu et al. | |
| 2019/0318240 A1 | 10/2019 | Kulkarni et al. | |
| 2019/0378238 A1 | 12/2019 | Ramadoss et al. | |
| 2020/0042362 A1* | 2/2020 | Cui | G06V 10/82 |
| 2020/0128051 A1* | 4/2020 | Sondhi | G06N 20/00 |
| 2020/0134461 A1* | 4/2020 | Chai | G06N 3/084 |
| 2021/0011764 A1* | 1/2021 | Kelly | G06F 9/505 |

FOREIGN PATENT DOCUMENTS

| | | | |
|---|---|---|---|
| CN | 105159769 A | 12/2015 | |
| CN | 107018184 A | 8/2017 | |
| CN | 107766148 A | 3/2018 | |
| CN | 108304250 A | 7/2018 | |
| CN | 109271015 A | 1/2019 | |
| CN | 110471758 A | 11/2019 | |
| CN | 110489223 A | 11/2019 | |
| CN | 110532078 A | 12/2019 | |
| TW | 201826122 A | 7/2018 | |
| TW | 201915724 A | 4/2019 | |

\* cited by examiner

MACHINE LEARNING WORKLOAD ORCHESTRATION IN HETEROGENEOUS CLUSTERS

BACKGROUND

Machine learning workloads may be distributed between multiple compute nodes. Some workloads may be processed in parallel independent of one another, while other workloads may be processed sequentially. Large-scale machine learning applications may be distributed among numerous compute nodes.

Data parallelism, model parallelism, and pipeline parallelism approaches to workload allocation of machine learning applications generally assume that dedicated compute nodes having homogeneous compute resources are readily available. Accordingly, constant hyperparameters are associated with all the distributed workloads of a given machine learning application.

BRIEF DESCRIPTION OF THE DRAWINGS

The written disclosure herein describes illustrative examples that are nonlimiting and non-exhaustive. Reference is made to certain of such illustrative examples that are depicted in the figures described below.

DETAILED DESCRIPTION

Large-scale data processing and the execution of complex applications can be performed by dividing the data processing tasks or complex application into a set of discrete workloads, some of which can be executed or otherwise processed in parallel. Orchestrating the execution of the various workflows in parallel or sequentially, as the specific workflows may dictate, can be performed by a plurality of compute nodes or clusters of compute nodes (compute clusters). Each compute node may be defined in terms of available compute resources. Similarly, a compute cluster may be defined in terms of the collective available compute resources of multiple compute nodes. As used herein, a compute cluster includes at least one compute node but may include multiple compute nodes. In a cloud computing environment, the various compute nodes can be selected to have homogeneous or near homogeneous compute resources. Some tasks, such as large-scale data processing, can be divided into any number of increasingly smaller and simpler workflows for parallel processing based on the number of discrete compute nodes and available compute resources.

In contrast, some complex applications, such as artificial intelligence applications and machine learning applications, may be divided into a limited number of workloads for execution by distributed compute clusters. For example, some of the workloads associated within a machine learning application cannot be further subdivided without destroying the functionality of the workload. As used herein, the term workload includes specific compute jobs or tasks and an associated or underlying dataset. Each compute job or task may include instructions for actions to be taken with respect to the associated dataset.

An orchestrating and/or scheduling system orchestrates the order in which each of the workloads is executed by different compute clusters and controls the exchange of computed data, such as learned or trained parameters, between the various workloads as the learning progresses. In a cloud computing environment, in which the compute clusters may have homogeneous or near homogeneous compute resources, it is assumed that each workflow is learning or otherwise progressing at the same rate. Accordingly, the compute nodes can synchronously communicate and exchange machine learning parameters without significant resource fragmentation or underutilization of any one compute node.

It is becoming increasingly important to efficiently manage the workloads associated with artificial intelligence and machine learning applications. Artificial intelligence and machine learning models may be trained in dedicated high-end servers or workstations, with multiple GPUs or machine learning accelerators (MLAs), as part of clusters or data centers (e.g., in the cloud). The models are later deployed, either in the cloud or at the edge, for inference and they generate insights for better data-driven decision-making.

For example, some artificial intelligence or other machine learning models utilize gang scheduling in which all the workloads of the application are scheduled for concurrent execution by a set of distributed compute clusters. Some portions of a workload executed by one compute node may be dependent on or otherwise utilize machine learning parameters provided by other compute clusters executing other workloads. In a network of homogeneous compute clusters, each compute node may be simultaneously ready to, for example, exchange machine learning parameters with each other.

However, in many instances, gang scheduling can lead to resource fragmentation and/or low utilization in shared clusters. This is especially true given that graphics processing units (GPUs) are often modeled as monolithic resources that cannot be shared at fine granularity. Furthermore, some artificial intelligence or other machine learning models, such as those based on stochastic gradient descent (SGD), utilize an exchange of parameters between compute clusters and/or between individual compute devices.

In some instances, it may be desirable to execute artificial intelligence or other machine learning applications using on-premises compute devices and/or edge devices. Unlike in a cloud computing environment, on-premises compute devices and edge devices may each have widely different compute resources. Thus, while a cloud computing environment can be modeled as a plurality of distributed compute clusters with homogeneous compute resources, on-premises and/or edge device networks are more accurately described as a plurality of distributed compute clusters with heterogeneous compute resources.

Examples of compute resources include, without limitation, central processing unit (CPU) resources, GPU resources, volatile memory resources, network communication capabilities, persistent storage resources, and the like. Compute clusters whose compute resources are identical or differ by less than a factor of 1.5 may be described as homogeneous, while those whose compute resources differ by more than 1.5 may be described as heterogeneous. For example, compute resources of homogeneous or heterogenous compute resources may be quantified and compared in terms of a function of one or more of available volatile memory, available persistent storage, processor clock speed, floating-point operations per second ("flops"), number of compute cores or processors, memory speed, network bandwidth, and the like. The assignment of machine learning workloads in a heterogeneous compute network can result in underutilization of some compute clusters and/or asynchronous learning parameter exchanges between compute clusters.

The presently described systems and methods provide machine learning models-aware and resources-aware workload scheduling for heterogeneous compute clusters, such as those found in many networks of on-premises compute devices and edge devices. The system may match workloads with compute clusters based on the compute demands associated with each respective workload and the available compute resources of each respective compute cluster. To compensate for the different processing speeds of each compute cluster, the hyperparameters associated with each workload may be defined or adjusted based on the compute resources of the compute cluster to which the workload is assigned.

As a simple example, if a first compute cluster has two GPUs and is assigned a workload with a batch size hyperparameter of 6,000, then a second compute cluster with four of the same GPUs may be assigned a similar workload with a batch size hyperparameter of 12,000. More generally, the batch size, epoch, and/or learning rate hyperparameters of each workload in a machine learning model may be individually defined and/or adjusted based on the compute resources of the compute cluster to which each respective workload is assigned and the dataset associated with each respective workload.

In various examples, the hyperparameters for the workload(s) assigned to each compute cluster may be selected to improve the overall learning outcome, reduce training time, minimize overhead communication, synchronize communication and machine learning parameter exchanges, and/or maximize compute resource utilization or efficiency. In some examples, the system can execute workloads defined to be stateless or stateful to facilitate migration and defragmentation.

In many instances, networks of on-premises compute devices and/or edge devices not only have heterogeneous compute resources, they also may be shared by several users and/or organizations. For example, a heterogeneous computing environment could include a pool of workstations/servers deployed in the same subnet. As another example, a heterogeneous computing environment could include a plurality of edge devices, such as Internet of Things (IoT) devices, gateways, autonomous cars, etc. that are connected via an intranet or via the Internet.

The presently described systems and methods for models-aware and resource-aware scheduling of workflows in networks of heterogeneous compute clusters can be applied to or used to modify a wide variety of existing techniques and approaches for cluster management, machine learning, deep learning, computer vision, and the like. For example, the basic cluster management approaches set forth in the Apache Mesos™, Kubernetes™, hierarchical Dominant Resource Fairness (DRF), and hierarchical max-min fairness architectures can be modified to incorporate the concepts disclosed herein. The concepts described herein can be added to an existing cluster management architecture. Accordingly, the existing functionality of a cluster management architecture can be augmented to allow for the dynamic assignment of hyperparameters to workloads based on the identified available compute resources of each different compute cluster and the dataset.

In one example, a workload orchestration system includes a discovery subsystem to identify the specific compute resources of each compute cluster in a network of heterogeneous compute clusters. A manifest subsystem receive or generate a manifest that describes the resource demands for each workload associated with an application, such as an artificial intelligence application or other machine learning application. The manifest may, for example, specify the compute resources demanded for a particular workload (e.g., in terms of the number of CPU cores, GPU resources, memory resources, policies, etc.). A placement subsystem may assign each workload to one of the compute clusters by matching or mapping the resource demands of each workload and the compute resources of each compute cluster. The placement subsystem may assign each workload in further consideration of affinity, anti-affinity, and/or co-locality constraints and policies. An adaptive modeling subsystem may dynamically define (e.g., establish, set, or modify) hyperparameters for each workload as a function of the identified compute resources of the compute cluster to which each respective workload is assigned and the dataset.

Various modules, systems, and subsystems are described herein as implementing functions and/or as performing various actions. In many instances, modules, systems, and subsystems may be divided into sub-modules, subsystems, or even as sub-portions of subsystems. Modules, systems, and subsystems may be implemented in hardware or as processor-executable instructions stored in, for example, a non-transitory computer-readable medium. Some examples may be embodied as a computer program product, including a non-transitory computer and/or machine-readable medium having stored thereon instructions that may be used to program a computer (or another electronic device) to perform processes described herein.

The examples of the disclosure may be further understood by reference to the drawings. It is readily understood that the components of the disclosed examples, as generally described and illustrated in the figures herein, could be arranged and designed in a wide variety of different configurations. Thus, the following detailed description of the examples of the systems and methods of the disclosure is not intended to limit the scope of the disclosure, as claimed, but is merely representative of possible examples of the disclosure. In addition, the elements of a method do not necessarily need to be executed in any specific order, or even sequentially, nor do the elements need to be executed only once, unless otherwise specified. In some cases, well-known features, structures, or operations are not shown or described in detail.

Figure 1:
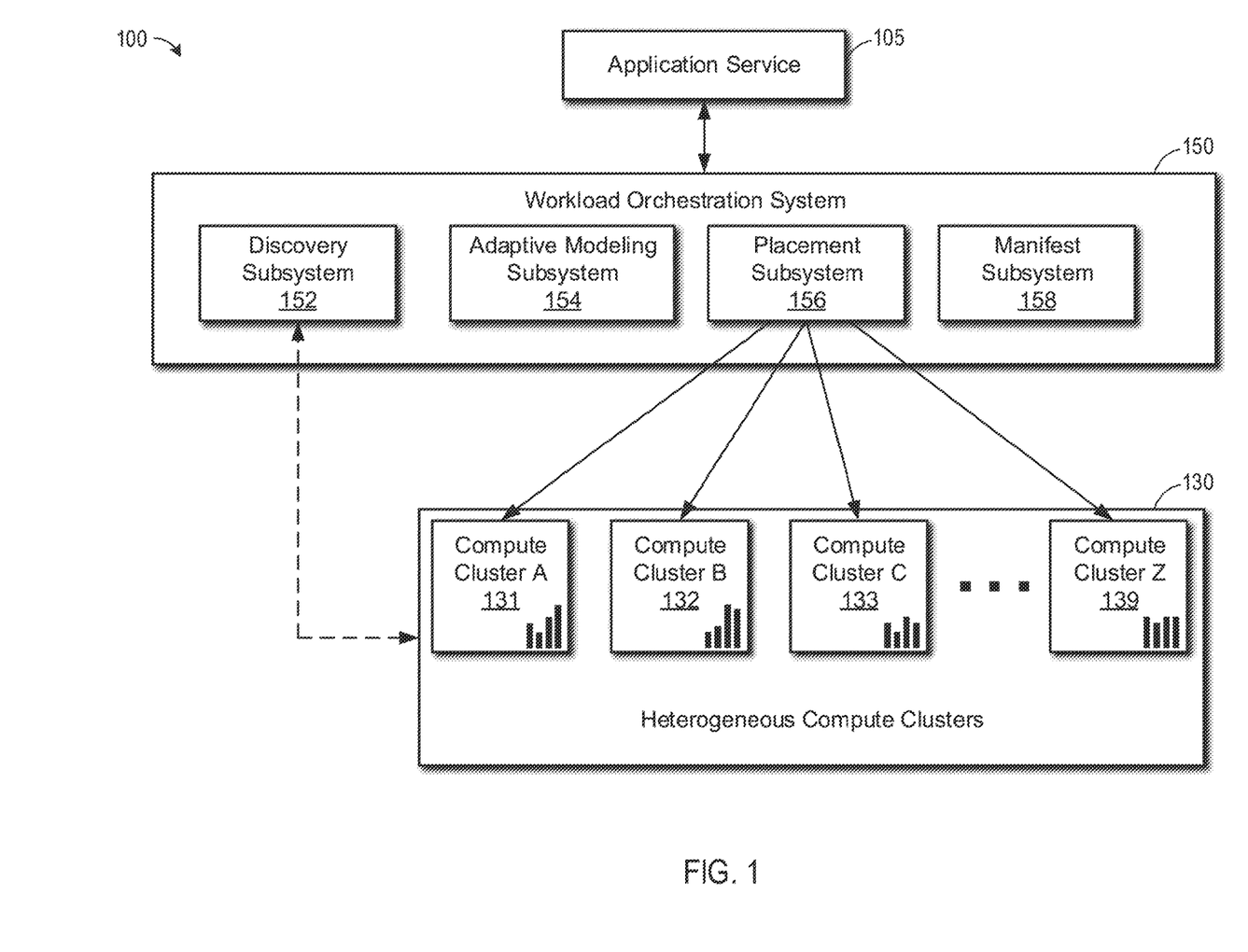
FIG. 1 illustrates an example block diagram of a workload orchestration system to orchestrate machine learning workloads among heterogeneous compute clusters.

FIG. 1 illustrates an example block diagram 100 of a workload orchestration system 150 to orchestrate machine learning workloads among heterogeneous compute clusters 130. An application service 105, such as an artificial intelligence application or other machine learning application, may communicate with the workload orchestration system 150 for distributed execution. The workload orchestration system 150 includes a discovery subsystem 152, an adaptive modeling subsystem 154, a placement subsystem 156, and a manifest subsystem 158.

The discovery subsystem 152 identifies or otherwise profiles the individual compute resources of each of compute clusters A, B, C, and Z (131, 132, 133, and 139) that are part of the heterogeneous compute clusters 130. The network of heterogeneous compute clusters 130 may include any number of compute clusters, but only four are illustrated in the example. The compute clusters A, B, C, and Z (131, 132, 133, and 139) may have various combinations of compute resources, graphically illustrated by bar charts in the lower right corner of each compute cluster 131-139. For instance, each compute cluster 131-139 may have different CPU resources, GPU resources, volatile memory resources, network bandwidth, network latency characteristics, persistent storage resources, or the like.

In some examples, the discovery subsystem 152 may identify the total (e.g., theoretical) compute resources of each compute cluster 131-139, currently available compute resources of each compute cluster 131-139, and/or expected or scheduled availability of compute resources of each compute cluster 131-139 during a future time window. Some compute clusters may have the same compute resources as one another while others may be heterogeneous.

The manifest subsystem 158 may maintain a manifest that describes or specifies the resource demands for each of a plurality of workloads that implement the application service 105. In some examples, the manifest subsystem 158 divides the application service 105 into the plurality of workloads based on the compute resources of the compute clusters 131-139 identified by the discovery subsystem 152. For example, the workloads may be intentionally selected to have resource demands that correspond to the identified compute resources of the compute clusters 131-139. In other embodiments, the manifest subsystem 158 may receive a manifest that describes the resource demands of predefined workloads that are, for example, specified by the application service 105 independent of the identified compute resources of the compute clusters 131-139.

A placement subsystem 156 allocates each workload to one of the compute clusters 131-139. For example, the placement subsystem 156 may match workloads of the application service 105 as defined in the manifest subsystem 158 with compute clusters 131-139 by matching the resource demands of each respective workload with the identified compute resources of each of the compute clusters 131-139.

In some examples, the placement subsystem 156 implements resources-aware workload scheduling in which the resource demands comprise metrics corresponding to the identified compute resources of the compute clusters 131-139 (e.g., CPU resources, GPU resources, vCPUs, volatile memory resources, network bandwidth, network latency characteristics, persistent storage resources, or the like). In other examples, the placement system 156 additionally implements models-aware workload scheduling in which the allocation of workloads to the compute clusters 131-139 is further based on co-locality, anti-affinity and/or affinity constraints and policies of workloads.

In some examples, the placement subsystem 156 may relax or ignore locality constraints based on the available compute resources. The resulting fragmentation may be resolved through migration and defragmentation, as described herein. That is, while the placement subsystem 156 may implement resources-aware and models-aware workload assignments, sometimes the models-aware constraints may be relaxed or even ignored based on limitations of the available compute resources. The workload orchestration system 150 may migrate workloads from one compute cluster 131-139 to another compute cluster 131-139 after partial or complete execution to satisfy affinity and/or co-locality constraints. The workload orchestration system 150 may implement a checkpoint approach that allows for the restoration of machine learning models to avoid rerunning, for example, training from the beginning.

An adaptive modeling subsystem 154 sets, adjusts, or otherwise defines the hyperparameters of each workload as a function of the identified compute resources of the compute cluster 131-139 to which each respective workload is assigned. The hyperparameters of a workload assigned to the compute cluster A 131 may be different than the hyperparameters of a workload assigned to the compute cluster B 132 due to the differing compute resources of compute clusters A and B (131 and 132, respectively). For instance, different batch sizes, number of epochs, learning rates, and/or other hyperparameters may be assigned to the workload(s) assigned to compute cluster A 131 than to the workload(s) assigned to compute clusters B-Z (132-139). The system may reduce straggler issues by dynamically modifying the hyperparameters of the workloads assigned to the various heterogeneous compute clusters 131-139 to synchronize or more closely synchronize execution of the workloads.

Figure 2A:
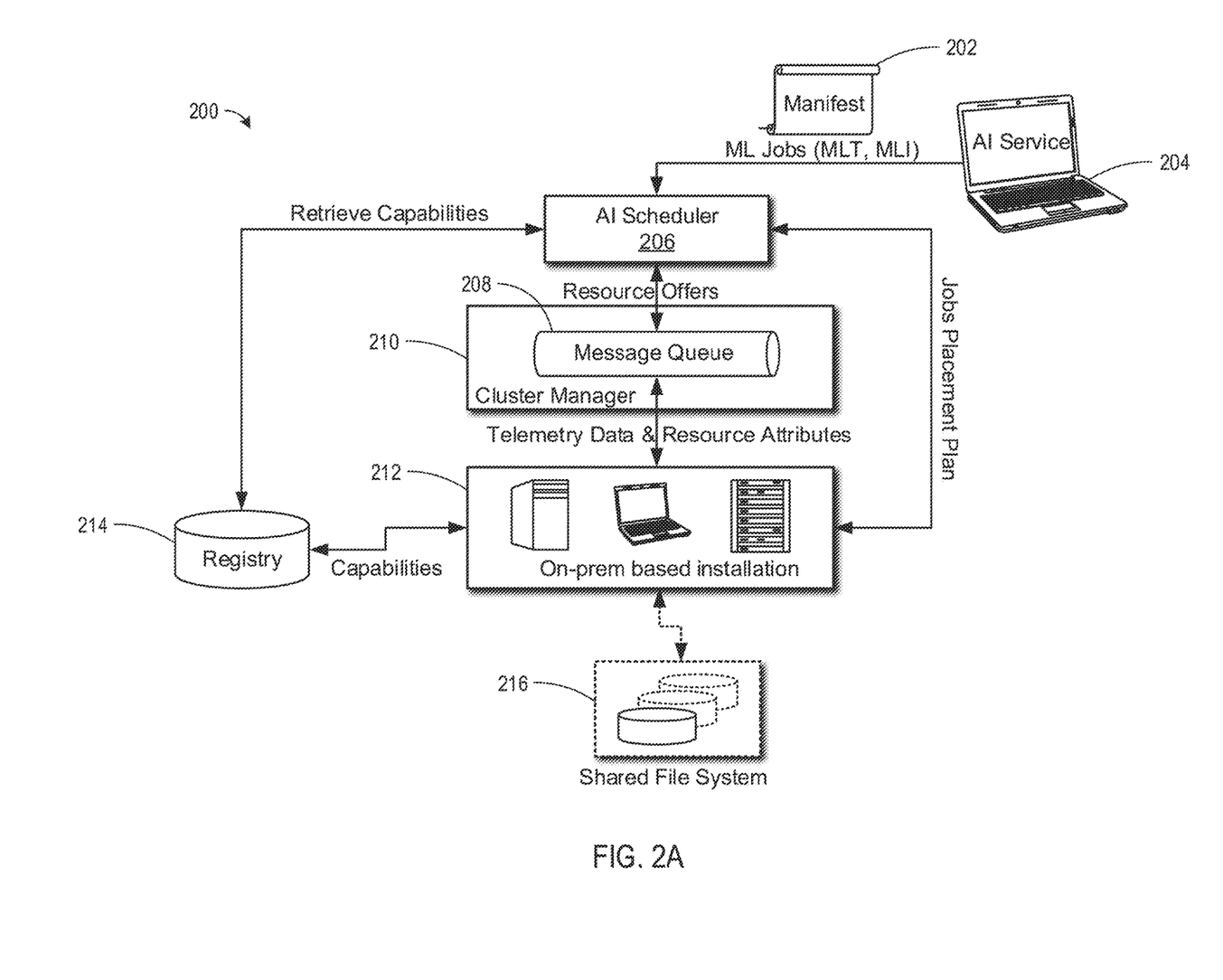
FIG. 2A illustrates a specific example of cluster management of an artificial intelligence application via a workload orchestration system in a heterogeneous network of on-premises compute devices.

FIG. 2A illustrates a specific example of cluster management of an artificial intelligence application 204 via a workload orchestration system 200 comprising a manifest 202, an artificial intelligence scheduler 206, a cluster manager 210, and a registry 214. The workload orchestration system 200 may implement cluster management in the heterogeneous network of on-premises compute devices 212. The manifest 202 may specify the resource demands for each of a plurality of workloads associated with the artificial intelligence application 204. The cluster manager 210, messaging queue 208, and the artificial intelligence scheduler 206 may be components of a placement subsystem that allocates each workload of the artificial intelligence application 204 to one of the compute devices in the network of on-premises compute devices 212 by, for example, matching the resource demands of each respective workload with identified compute resources of each respective compute device.

The registry 214 may be maintained by a discovery subsystem, as previously described. In some examples, the registry 214 may be a dynamic database identifying the compute resources of each of the compute devices in the network of on-premises compute devices 212. The workload orchestration system 200 may also set, adjust, or otherwise define the hyperparameters of each assigned workload as a function of the identified compute resources of the compute devices in the network of on-premises compute devices 212. The discovery subsystem may acquire or reserve compute resources as they become available. Accordingly, since compute resource availability is dynamic, the workload orchestration system 200 may use an hysteresis margin to acquire resources with appropriate locality and/or affinity to meet the corresponding resource demands of the workdloads.

The workload orchestration system 200 may assign workloads to the compute devices in the network of on-premises compute devices 212 in a resources-aware manner. That is, the workload orchestration system 200 may assign workloads to the compute devices by matching or mapping the compute resources of each compute device with the resource demands of each workload. In some examples, the workload orchestration system 200 may also assign the workloads to the compute devices in a models-aware manner. That is, the workload orchestration system 200 may assign the workloads to the compute devices in further consideration co-locality constraints, anti-affinity, and/or affinity constraints and policies of the workloads.

The workload orchestration system 200 may isolate workloads (e.g., machine learning training and interference jobs) of the artificial intelligence application 201. The workload orchestration system 200 may assign workloads to the compute devices in the network of on-premises compute devices 212 based at least in part on an evaluation of network communication costs associated with assigning workloads to distributed computing devices having the computational benefits of increased GPU resources and/or or other accelerator resources.

In some examples, the workload orchestration system 200 may implement preemption policies for the compute resources of the compute devices in the network of on-premises compute devices 212 to enforce resources sharing (e.g., the shared file system 216). The preemption policies can be set to avoid using the full capacity of any one compute device and/or mitigate head-of-line issues. In some examples, if higher priority jobs arrive in the message queue 208 while there are lower priority jobs running, the system 200 may free up compute resources of the compute devices in the network of on-premises compute devices 212 to focus on the higher priority jobs. For example, the lower priority jobs may be temporarily suspended while the higher priority jobs are executed.

Figure 2B:
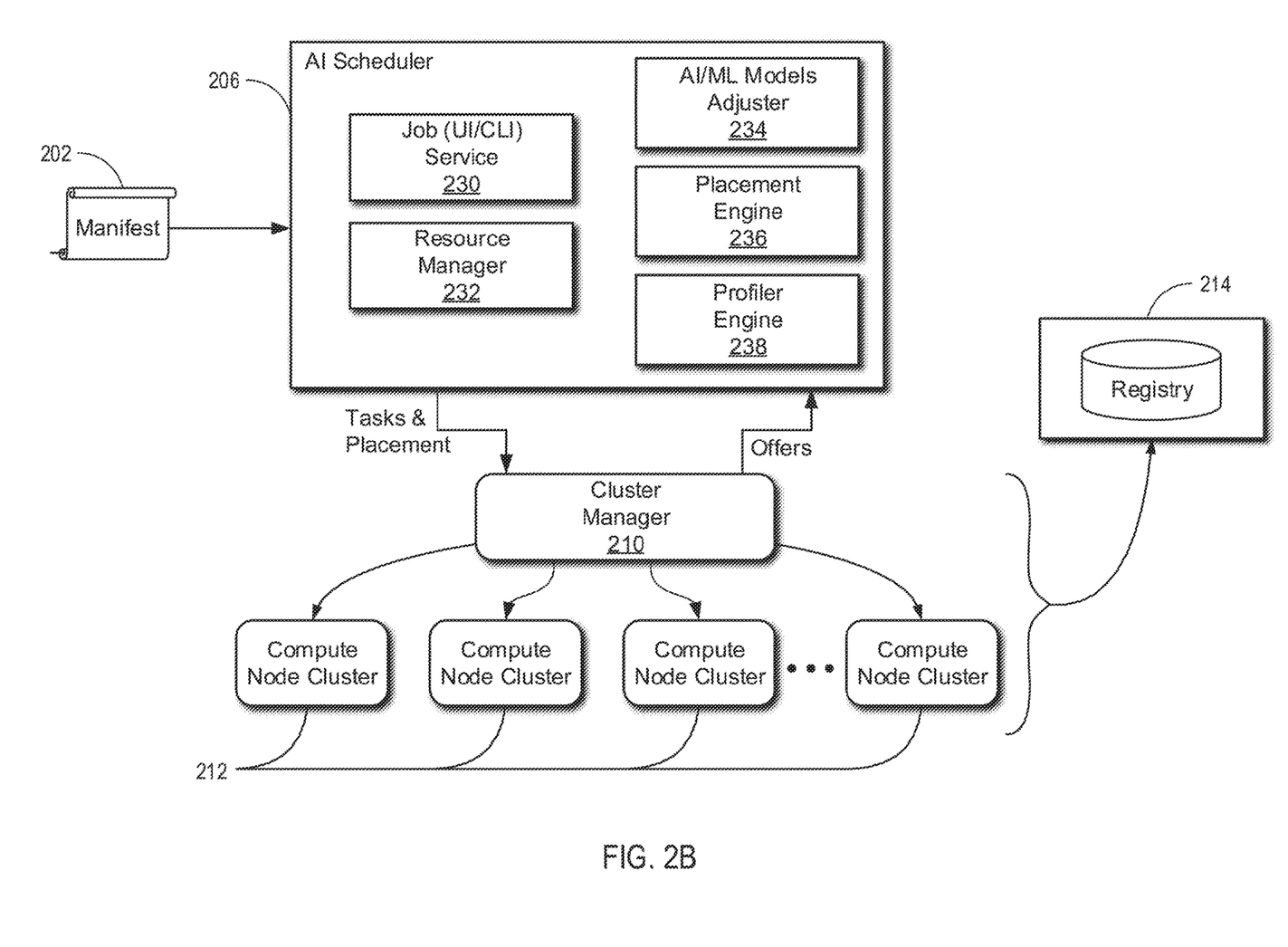
FIG. 2B illustrates a block diagram of example subsystems of the artificial intelligence scheduler of FIG. 2A.

FIG. 2B illustrates a block diagram of example subsystems 230-238 of the artificial intelligence scheduler 206 of FIG. 2A. The manifest 202, cluster manager 210, network of on-premises compute devices 212, and register 214 are described above in the context of FIG. 2A. In the illustrated example, the artificial intelligence scheduler 206 includes a job service subsystem 230, a resource manager subsystem 232, an artificial intelligence or machine learning model adjuster subsystem 234, a placement engine subsystem 236, and a profiler engine subsystem 238. The various subsystems 230-238 may be part of the discovery, adaptive modeling, and placement subsystems described herein (e.g., in conjunction with FIG. 1).

Figure 3:
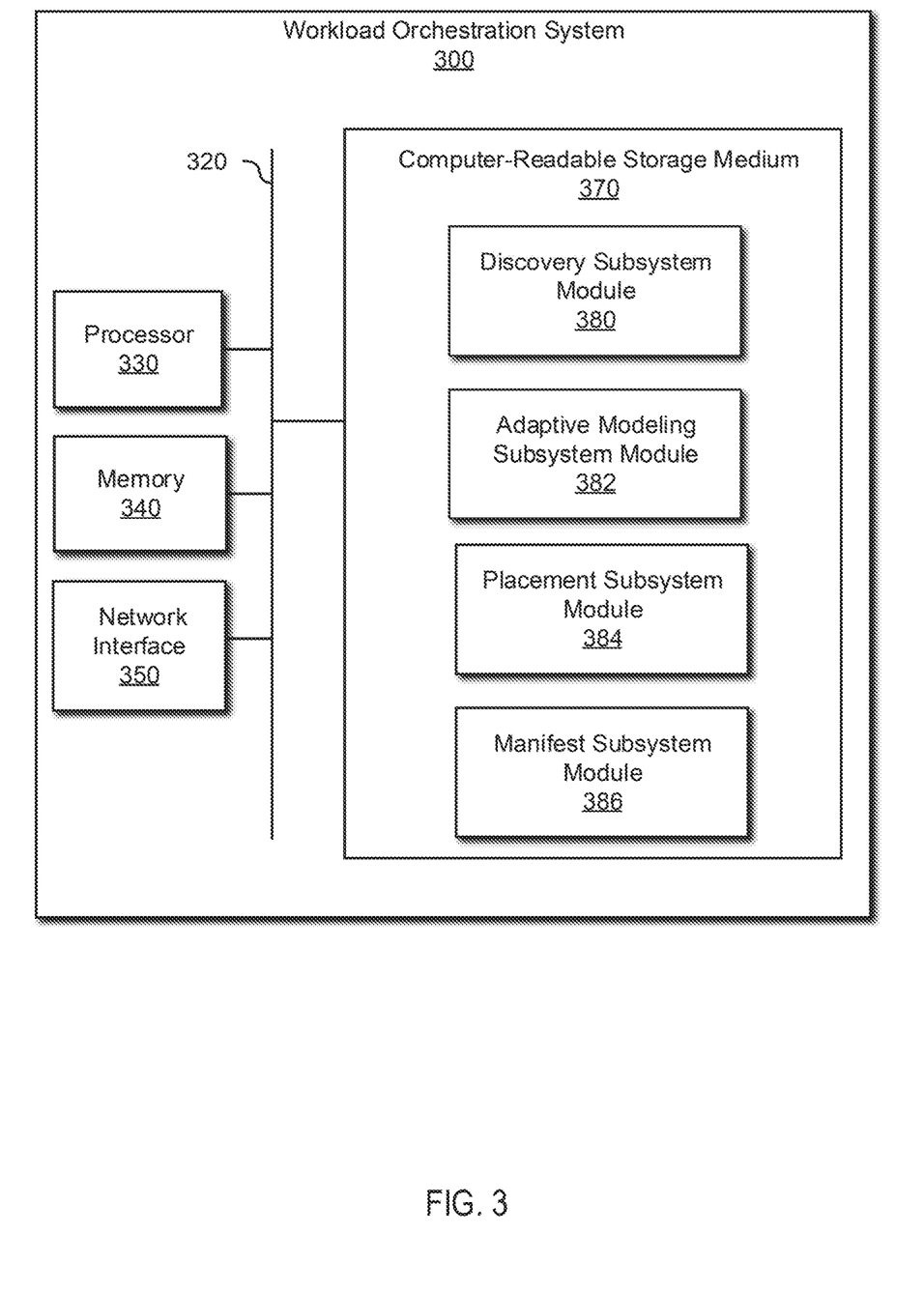
FIG. 3 illustrates a block diagram of an example workload orchestration system implemented in a computer system.

FIG. 3 illustrates a block diagram of an example workload orchestration system 300 implemented in a computer system. As illustrated, a workload orchestration system 300 may include a processor 330, memory 340, and a network interface 350 connected to a computer-readable storage medium 370 via a communication bus 320. The processor 330 may execute or otherwise process instructions stored in the computer-readable storage medium 370. The instructions stored in the computer-readable storage medium 370 include operational modules 380-386 to implement the subsystems described herein.

For example, a discovery subsystem module 380 may discover the compute resources of each compute cluster of a plurality of compute clusters. At least some of the compute clusters may have differing compute resources. For example, the compute resources between different compute clusters may differ in magnitude by at least a factor of 1.5 (e.g., by a factor of 2, 10, 100, 1000, etc.) and be considered heterogeneous compute clusters. An adaptive modeling subsystem module 382 may associate hyperparameters with each workload associated with an application (such as an artificial intelligence or other machine learning application) based at least in part on the compute resources of the compute cluster to which each respective workload is assigned.

A placement subsystem module 384 may assign each workload to a compute cluster that has compute resources corresponding to the resource demands of each respective workload. The manifest subsystem module 386 may identify resource demands of predefined workloads of an application. Alternatively, the manifest subsystem module 386 may divide an application, such as a machine learning application, into a plurality of workloads with each workload having resource demands corresponding to the compute resources of the compute clusters.

The specific arrangement of subsystems and modules may be modified from the specific examples illustrated. Accordingly, any of a wide variety of computing systems, electronics, computer-executable instructions, network configurations and the like may be adapted to implement the concepts described herein.

Figure 4:
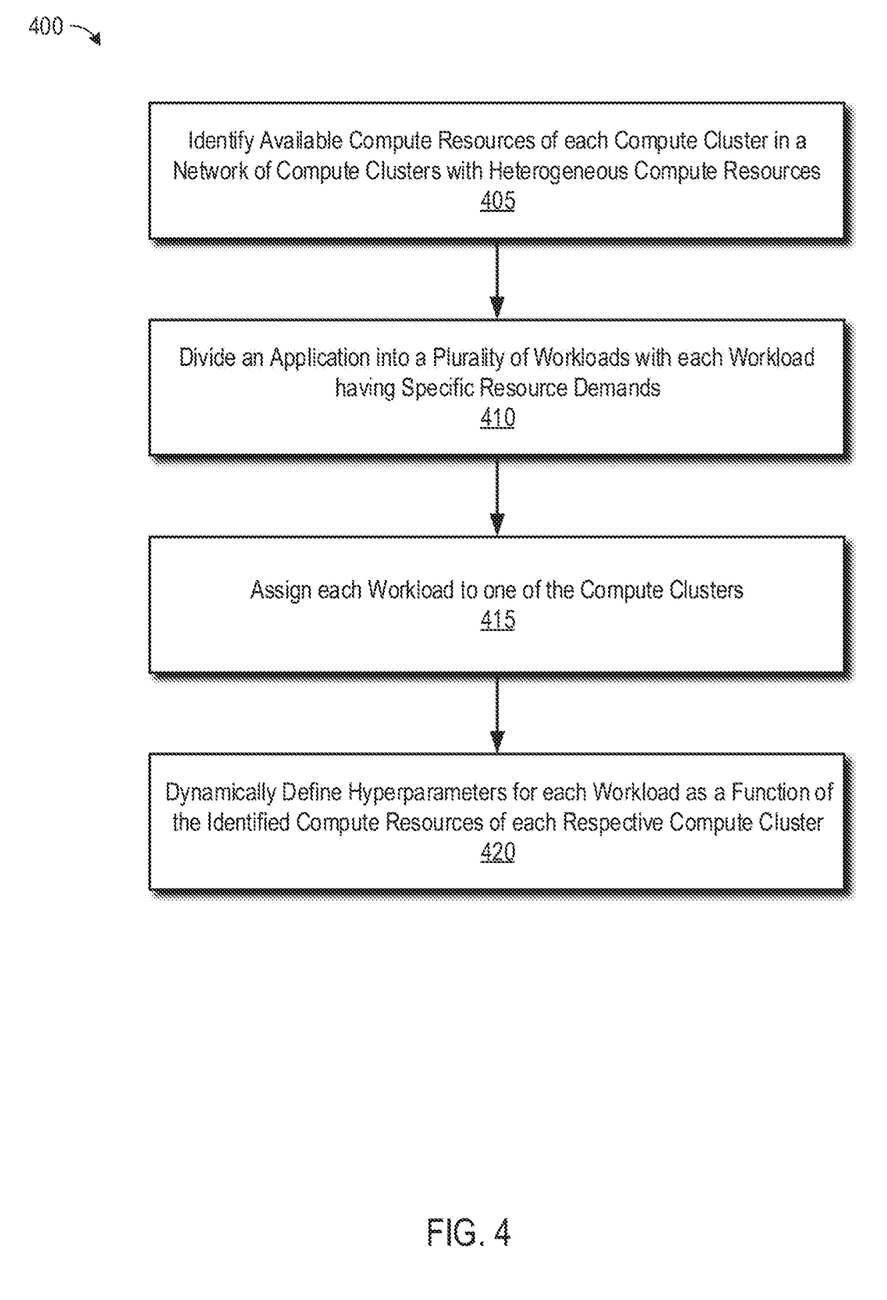
FIG. 4 illustrates a flowchart of a method to allocate workloads of a machine learning application to heterogeneous compute clusters based on discovered resources and estimated resource demands.

FIG. 4 illustrates a flowchart 400 of a method to allocate workloads of an application, such as an artificial intelligence application, to heterogeneous compute clusters based on discovered compute resources of individual compute clusters and estimated workload resource demands. The system may identify, at 405, available compute resources of each compute cluster in a network of compute clusters with heterogeneous compute resources. The system may identify resource demands of predefined workloads of an application. Alternatively, the system may divide, at 410, an application, such as a machine learning application, into a plurality of workloads, with each workload having resource demands corresponding to the compute resources of the compute clusters.

The system may assign, at 415, each workload to one of the compute clusters. For example, each workload may be assigned to one of the compute clusters based on a matching between the resource demands of each workload and available compute resources of the respective compute cluster to which each workload is assigned. The system may dynamically define, at 420, hyperparameters for each workload as a function of the identified compute resources of each respective compute cluster and the dataset.

Specific examples of the disclosure are described above and illustrated in the figures. It is, however, appreciated that many adaptations and modifications can be made to the specific configurations and components detailed above. In some cases, well-known features, structures, and/or operations are not shown or described in detail. Furthermore, the described features, structures, or operations may be combined in any suitable manner. It is also appreciated that the components of the examples as generally described, and as described in conjunction with the figures herein, can be arranged and designed in a wide variety of different configurations. Thus, all feasible permutations and combinations of examples are contemplated. Furthermore, it is appreciated that changes may be made to the details of the above-described examples without departing from the underlying principles thereof.

In the description above, various features are sometimes grouped together in a single example, figure, or description thereof for the purpose of streamlining the disclosure. This method of disclosure, however, is not to be interpreted as reflecting an intention that any claim now presented or presented in the future requires more features than those expressly recited in that claim. Rather, it is appreciated that inventive aspects lie in a combination of fewer than all features of any single foregoing disclosed example. The claims are hereby expressly incorporated into this Detailed Description, with each claim standing on its own as a separate example. This disclosure includes all permutations and combinations of the independent claims with their dependent claims.

What is claimed is:

1. A workload orchestration system, comprising:
a discovery subsystem to identify compute resources of each compute cluster of a plurality of compute clusters, wherein the compute clusters have heterogeneous compute resources;
a manifest subsystem to generate the resource demands for each workload of a plurality of workloads associated with an application and dataset and to maintain a manifest that identifies the resource demands for each workload of the plurality of workloads;
a placement subsystem to assign each workload to one of the compute clusters based on a matching of (i) the generated resource demands of each respective workload and (ii) the identified compute resources of each compute cluster; and
an adaptive modeling subsystem to define hyperparameters of each workload as a function of the identified compute resources of the compute cluster to which each respective workload is assigned and the dataset.

2. The system of claim 1, wherein the manifest subsystem is to identify co-locality constraints and a policy of two of the workloads, and
wherein the placement subsystem assigns the two workloads having the co-locality constraints to the same compute cluster.

3. The system of claim 1, wherein the manifest subsystem is to identify affinity constraints of two of the workloads, and
wherein the placement subsystem assigns the two workloads having the affinity constraints to the same compute cluster.

4. The system of claim 1, wherein the compute resources of each compute cluster identified by the discovery subsystem comprise at least one of central processing unit (CPU) resources, graphics processing unit (GPU) resources, volatile memory resources, network bandwidth, and persistent storage resources.

5. The system of claim 1, wherein the resource demands of each workload generated by the manifest subsystem comprise at least one of an anti-affinity constraint, a locality constraint, communication overhead demands, central processing unit (CPU) demands, graphics processing unit (GPU) demands, volatile memory demands, network bandwidth demands, and persistent storage demands.

6. The system of claim 1, wherein the compute resources identified by the discovery subsystem comprise total compute resources and available compute resources, and
wherein the placement subsystem assigns the workloads based on the available compute resources.

7. The system of claim 1, wherein the hyperparameters defined by the adaptive modeling subsystem comprise at least one of batch size, epoch, learning rate.

8. The system of claim 1, wherein the application comprises at least a portion of one of: a machine learning application, or an artificial intelligence application.

9. The system of claim 1, wherein the manifest subsystem divides the application into the plurality of workloads based on the identified compute resources of each compute cluster in the plurality of compute clusters.

10. A method, comprising:
identifying available compute resources of each compute cluster of a plurality of compute clusters with heterogeneous compute resources;
dividing an application into a plurality of workloads with each workload having resource demands based at least in part on the identified compute resources of at least two of the compute clusters;
maintaining a manifest in a manifest subsystem that generates-identifies the resource demands for each workload of the plurality of workloads;
assigning each workload to one of the compute clusters based on a matching of (i) the resource demands of each respective workload and (ii) the compute resources of each compute cluster; and
defining hyperparameters for each workload as a function of an associated dataset and the identified compute resources of the compute cluster to which each respective workload is assigned, such that at least two of the workloads have different hyperparameters.

11. The method of claim 10, wherein the compute resources of each compute cluster and the resource demands of each workload are defined in terms of at least one of central processing unit (CPU) resources, graphics processing unit (GPU) resources, volatile memory resources, network communication capabilities, or persistent storage resources.

12. The method of claim 10, wherein the hyperparameters defined by the adaptive modeling subsystem comprises at least one of batch size, epoch, or learning rate.

13. The method of claim 10, further comprising:
identifying a change in available compute resources of one of the compute clusters; and
modifying a hyperparameter of a workload assigned to the compute cluster in which the change in available compute resources was identified.

14. A non-transitory computer-readable medium with instructions stored thereon that, when executed by a processor of a computing device, cause the computing device to:
discover compute resources of each compute cluster of a plurality of compute clusters, wherein at least two of the compute clusters have compute resources that differ in magnitude by at least a factor of two;
divide a machine learning application into a plurality of workloads with each workload having resource demands met by at least one of the compute clusters;
maintain a manifest in a manifest subsystem that generates identifies the resource demands for each workload of the plurality of workloads;
assign each workload to a compute cluster that has compute resources corresponding to the resource demands of each respective workload; and
associate hyperparameters with each workload based at least in part on the compute resources of the compute cluster to which each respective workload is assigned and a dataset associated with each respective workload.

15. The non-transitory computer-readable medium of claim 14, wherein the machine learning application is part of an artificial intelligence application.

16. The system of claim 1, wherein the compute resources of at least two compute clusters of the plurality of compute clusters differ in magnitude by at least a factor of 1.5.

17. The system of claim 1, wherein the manifest subsystem is to automatically generate the resource demands for each workload of the plurality of workloads.

18. The method of claim 10, wherein the compute resources of at least two compute clusters of the plurality of compute clusters differ in magnitude by at least a factor of 1.5.

19. The method of claim 10, wherein the resource demands of the plurality of workloads are determined and generated automatically.

20. The non-transitory computer-readable medium of claim 14, wherein the instructions, when executed by the processor of the computing device, cause the computing device to automatically discover the compute resources of each compute cluster of the plurality of compute clusters.

* * * * *